March 10, 1959   J. J. JAEGER   2,876,661
AUTOMATIC ROTARY POSITIONING MEANS
Filed April 17, 1956   9 Sheets-Sheet 1

FIG_1

INVENTOR
JACOB J. JAEGER
BY *Joseph N. Schofield*
ATTORNEY.

FIG. 2

FIG_3

FIG_4

March 10, 1959

J. J. JAEGER 2,876,661

AUTOMATIC ROTARY POSITIONING MEANS

Filed April 17, 1956

INVENTOR
JACOB J. JAEGER
BY Joseph J. Schofield
ATTORNEY

March 10, 1959

J. J. JAEGER 2,876,661

AUTOMATIC ROTARY POSITIONING MEANS

Filed April 17, 1956

FIG_8

INVENTOR
JACOB J. JAEGER
BY Joseph H. Schofield
ATTORNEY

FIG.9A

WALL #4

FIG.9B

WALL #1

FIG.12

United States Patent Office 2,876,661
Patented Mar. 10, 1959

2,876,661

AUTOMATIC ROTARY POSITIONING MEANS

Jacob J. Jaeger, North Canton, Conn., assignor to Pratt & Whitney Company, Incorporated, West Hartford, Conn., a corporation of Delaware Application April 17, 1956, Serial No. 578,826

9 Claims. (Cl. 74—821)

This invention relates to an improved automatic positioning means for a machine tool support, and more specifically, to an improved automatic indexing means for a rotary table.

The problem of accurately locating points in polar coordinates is frequenly encountered in the machine tool art. While this problem has been solved to some degree, with the advent of automation, it has become increasingly necessary to incorporate automatic programming into positioning devices for rapid inspection, calibration and machining jobs, such as for example, those involving circular spacing and angular positioning; all of these requirements must be achieved quickly and with a high degree of precision. The automatic indexing means about to be described, accomplishes these objectives with the requisite dispatch and accuracy; by these means, once a plurality of index points have been established, the operator has only to press a button to actuate a switch, and the table or work support automatically indexes from one point to the next, so as to arrive at the desired null point without hunting. Moreover, braking means are provided to securely hold the work support in fixed position while the machining operations proceed. If the work support should drift for any reason, a warning means enables the operator to halt operations until the cause of this disturbance is ascertained and corrected.

In a preferred form there is provided in a machine tool, a tool or work support arranged to be movable to a preselected position. Means are provided for displacing the support, and control means are arranged for controlling the displacing means so as to advance, and then reverse the direction of displacement of the work support, so as to move the support into the preselected position without hunting.

Accordingly, it is an object of this invention to provide an improved automatic positioning means for moving a machine tool support into a preselected position without hunting.

Another object is to provide an improved automatic positioning means which will fixedly maintain a work support at a preselected position without drifting.

The novel features which are believed to be characteristic of the invention are set forth with particularity in the appended claims. The invention itself, however, both as to its organization and method of operation, together with further objects and advantages thereof, may best be understood by reference to the following description when read in connection with the accompanying drawings in which:

Figure 1:
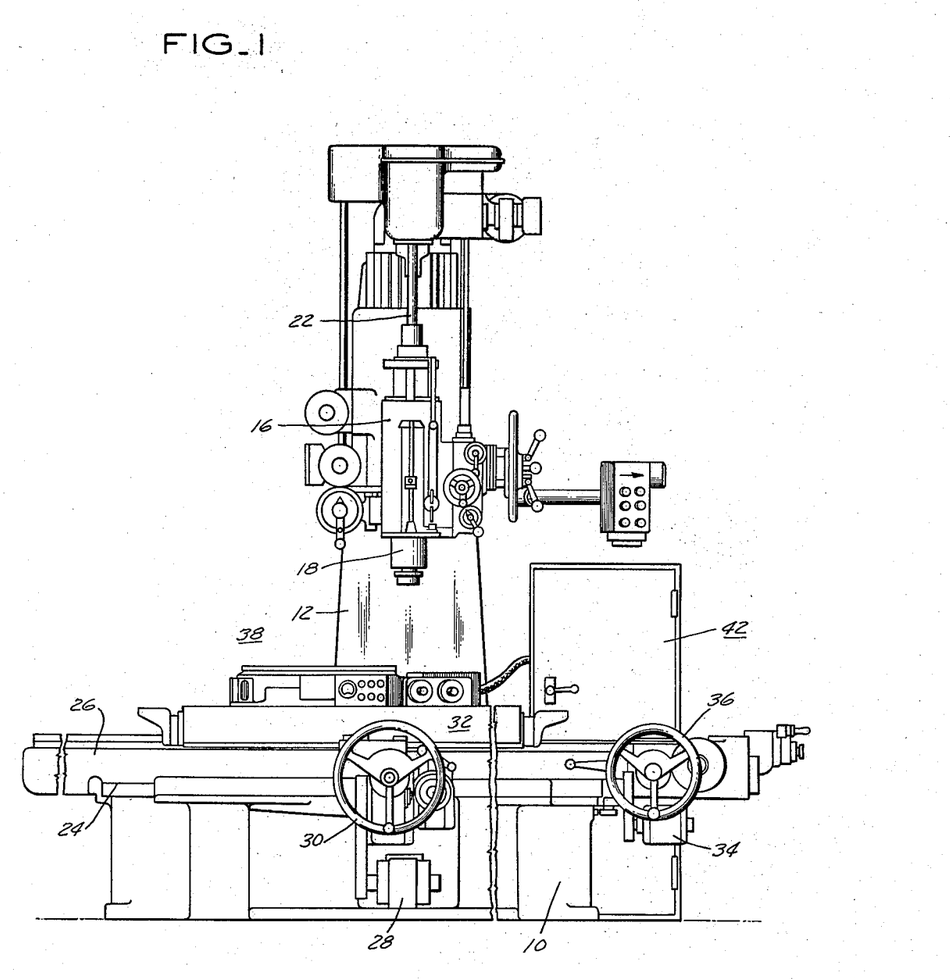
Figure 1 is a front elevation of a complete machine in which the present invention may be incorporated.
Figure 2:
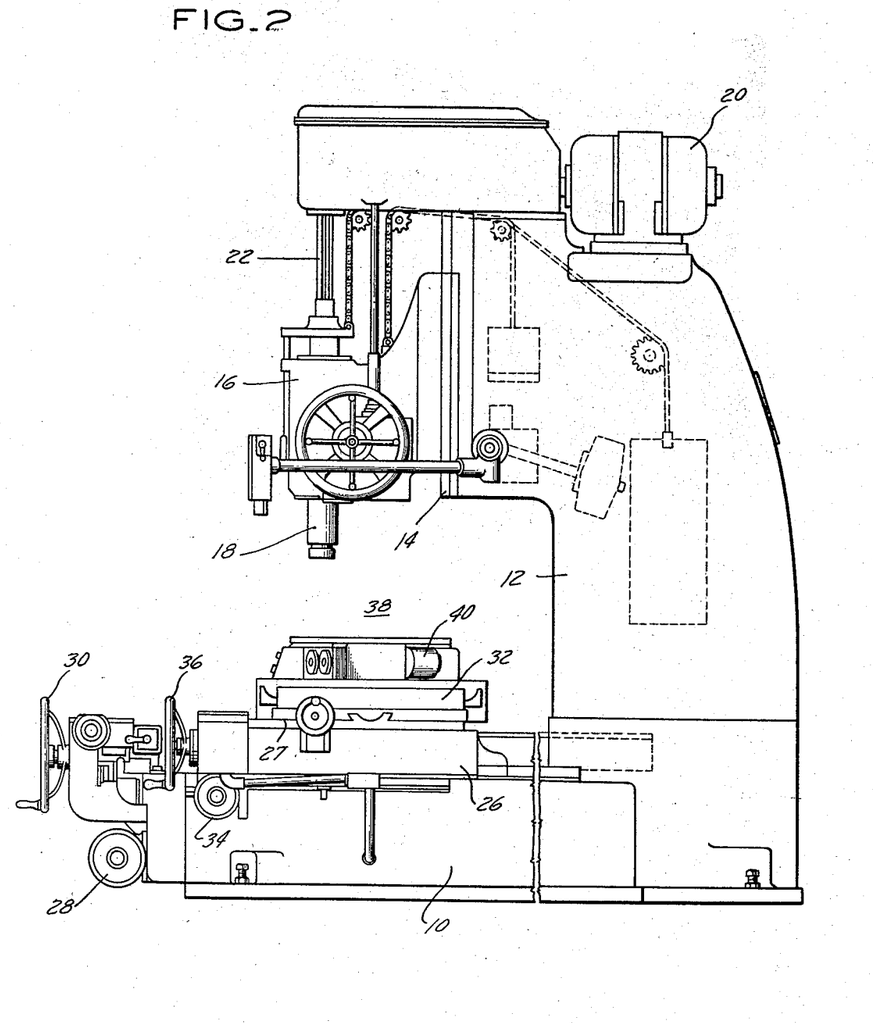
Fig. 2 is a side elevation of the machine shown in Fig. 1.

Referring first to Figs. 1 and 2 of the drawings, it will be seen that the vertical jig borer includes a base 10, having a column 12 attached to one portion thereof, the column 12 having vertical guideways 14 formed on a forward surface. A head or carriage 16 is arranged for displacement along these ways 14, and within the head 16 a rotatable tool mounting spindle 18 is slidably mounted. The spindle 18 may be displaced manually or automatically within the head 16.

A motor 20 is mounted on the rear elevated portion of the column 12; the motor 20 is coupled, by suitable driving connections (not shown), to the upper end of splined shaft 22, which is connected to, and rotatable with, the spindle 18. From the discussion so far, it will be apparent that a cutter or tool, mounted in the lower end of the spindle 18, may be rotated at a predetermined speed, and may also be moved up or down within the carriage or head 16 by hand or power means.

Suitable horizontal guideways 24 are provided on the forward portion of the base 10. A saddle 26 is movably mounted on the guideways 24 so that it may be displaced directly toward and from the column 12 as required. The saddle 26 may be traversed back and forth along the ways either automatically by means of an electric motor 28 or manually by rotation of a hand wheel 30 through suitable driving connections (not shown). On the upper surface of the saddle 26 there is a work mounting table 32; the table 32 is movable in a horizontal plane on suitable guideways 27, at right angles to the direction of movement of the saddle. The table 32 may be traversed along its guideways by an electric motor 34, or by rotation of a hand wheel 36 through driving connections (not shown). The rotary table of the invention, indicated generally at 38, is mounted on the work table 32 by any suitable means. It should be noted that in other practical embodiments, the rotary table 38 is arranged integral with the work table 32. As will presently be made clear, the table 38 is coupled to an electric motor 40, through an arrangement of gears and clutches, the selection of the desired driving or braking connection being accomplished by electrical circuitry which may be conveniently housed in a cabinet 42 conveniently located near the machine. (Note in Fig. 2 the cabinet has not been shown in the interests of clarity.)

Figure 3:
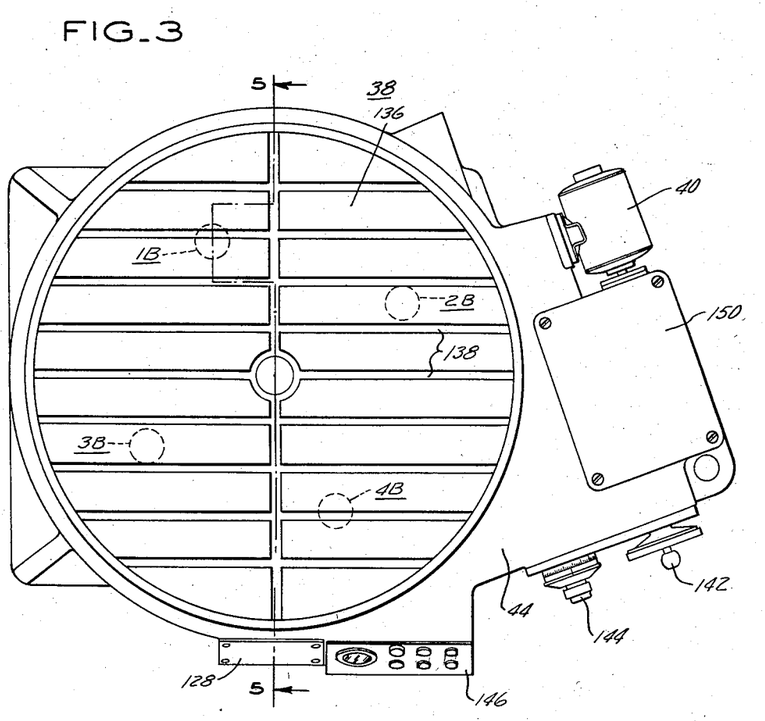
Fig. 3 is a top plan view of an illustrative embodiment of a motor driven rotary table in accordance with the invention.
Figure 4:
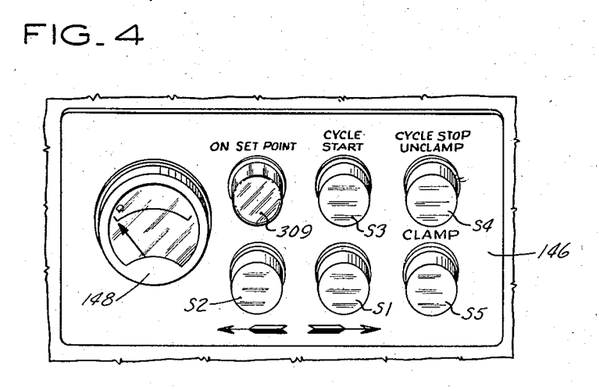
Fig. 4 is an enlarged view of the control panel for the rotary table of Fig. 3.
Figure 5:
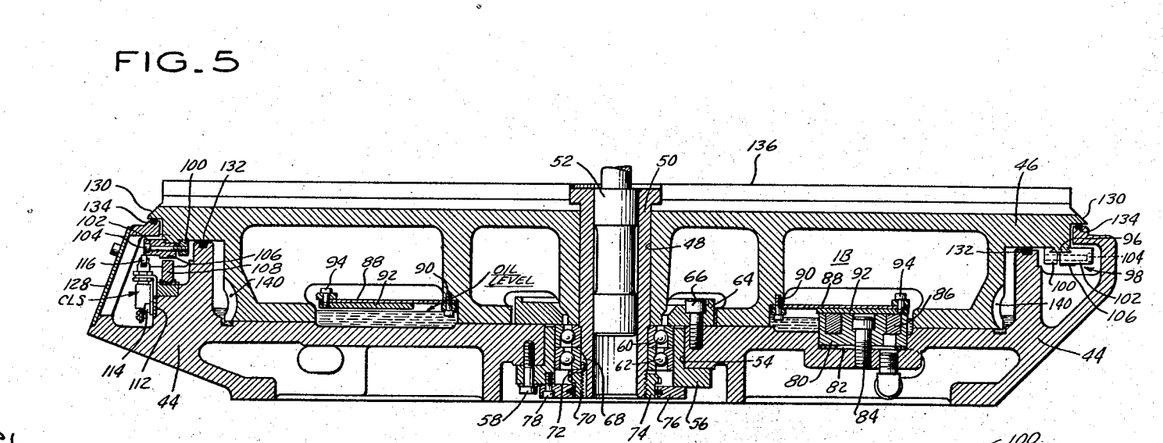
Fig. 5 is a sectional view of the rotary table taken along the lines 5—5 of Fig. 3.

Referring now to Figs. 3, 4 and 5, the rotary table 38 includes a base 44 upon which a support member 46 is rotatably mounted. The support 46 is bored at 48 to accommodate a center plug bushing 50 which is internally adapted so as to receive a tapered proving bar 52 (shown only in Fig. 5). (The bar 52 is used to aid in positioning a number of work pieces with reference to a common center.) The base 44 is centrally bored at 54 to receive a table bearing ring 56, the ring being fastened to the base by a plurality of machine bolts 58. A pair of ball bearings 60, 62 are arranged, in preloaded fashion, with their respective inner races in contiguous relation with the outer wall of the bushing 50, while their outer races are pressed against the inner surface of ring 56 as shown in Fig. 5. A bearing retainer ring 64 is secured to the base 44 by means of a number of bolts 66, the ring 64 having an internal diameter sufficiently large to permit rotational displacement of the support 46. The bushing 50 is recessed for a portion of its length at 68, and is threaded at its lower end 70 so as to cooperate with the locking combination of the washer 72 and the locknut 74. The lower portion of this mounting is protected against dust by means of a dust cover 76 secured to ring 56 by means of a number of machine bolts 78.

The rotary table is provided with four brakes indicated generally at 1B (Figs. 3, 5 and 11), 2B, 3B and 4B (Figs. 3 and 11) which are of the electromagnetic type well known in the art. Since all these units are identical in construction, only one need be described. Briefly, the brake 1B comprises a shell 80 and a spacer 82 secured to the base 44 by means of a bolt 84. A magnetic coil 86 is positioned within a suitable recess in the shell 80. A ring diaphragm 88 is secured to the support 46 by means of a plurality of bolts 90. A binder plate 92, fashioned in the shape of a ring, is secured to the underside of ring diaphragm 88 by means of bolts 94. The binder plate 92 and the shell 80 are so arranged that there is a clearance of some .002–.006 of an inch between the ring diaphragm 88 and the binder plate 92 when the brake is deenergized.

Figure 7:
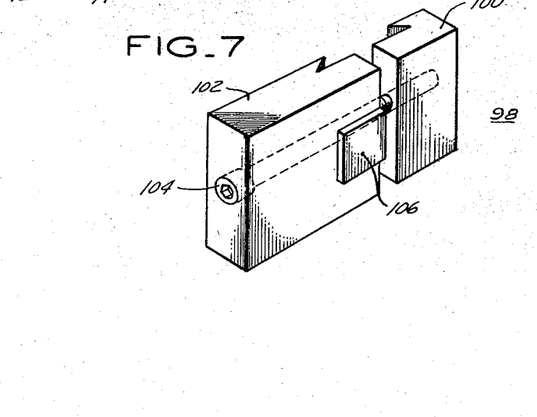
Fig. 7 is a pictorial view of the indexing dog.

The underside of support 46 contains a circular dovetail projection shown at 96 for receiving an indexing dog indicated generally at 98 (Figs. 5 and 7). The dog has a complementary groove for engaging the dovetail 96, and comprises two parts 100, 102 through which is passed a locking screw 104. The part 104 includes a projection 106 which is adapted to cooperate with a magnetic leg 108, which is suitably mounted in the base 44. There is a spacing of some several thousandths of an inch between the projection 106 and the top of magnetic leg 108 so that the support 46 is free to turn. The magnetic leg 108 is part of an electrolimit measuring system of the type described in U. S. Patent 2,440,916. Briefly, two coils are positioned on the outer extensions of an E-shaped magnetic block (the part 108 forms the middle extension or leg). These coils are arranged as two arms in an impedance bridge, so that when the projection 106 is closer to one or the other coil, their inductances are changed respectively, and hence, the bridge is unbalanced and an electrical output (error signal) is obtained. When the bridge is perfectly balanced, the projection 106 is exactly centered between the coils and the error signal is zero.

Figure 6:
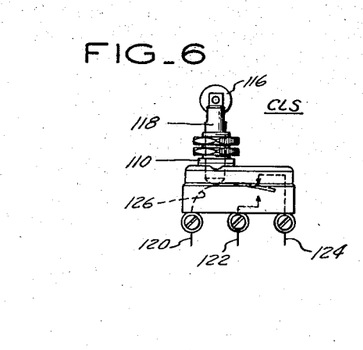
Fig. 6 is an enlarged schematic view of the cycle limit switch.

The cycle limit switch CLS is shown in Figs. 5 and 6. It comprises a body portion 110 which is secured to the base 44 by means of a mounting bracket 112 and a bolt 114. The CLS includes a wheel 116 carried on the end of a post or plunger 118 which is adapted for longitudinal displacement within the body 110. The cycle limit switch CLS includes terminals 120, 122, 124. A spring leaf member 126 resiliently urges the post 118 in the upward direction, so that there is electrical connection between terminals 120 and 124. As will be made clear as this description proceeds, when the dog 98 depresses the wheel 116, the spring leaf member 126 is forced in a downward direction completing the circuit between terminals 120, 122; the body 110 of CLS is suitably recessed to receive the wheel 116 for its full downward displacement.

In adjusting the dogs 98 initially, access to the mechanism just described is obtained by means of removable cover 128. The support 46 is graduated in degrees around the periphery at 130. The base member includes a peripheral ring of felt 132 which serves as a protection against dust. An oil resistance rubber ring 134 provides smooth rotation of work support member 46.

Figure 8:
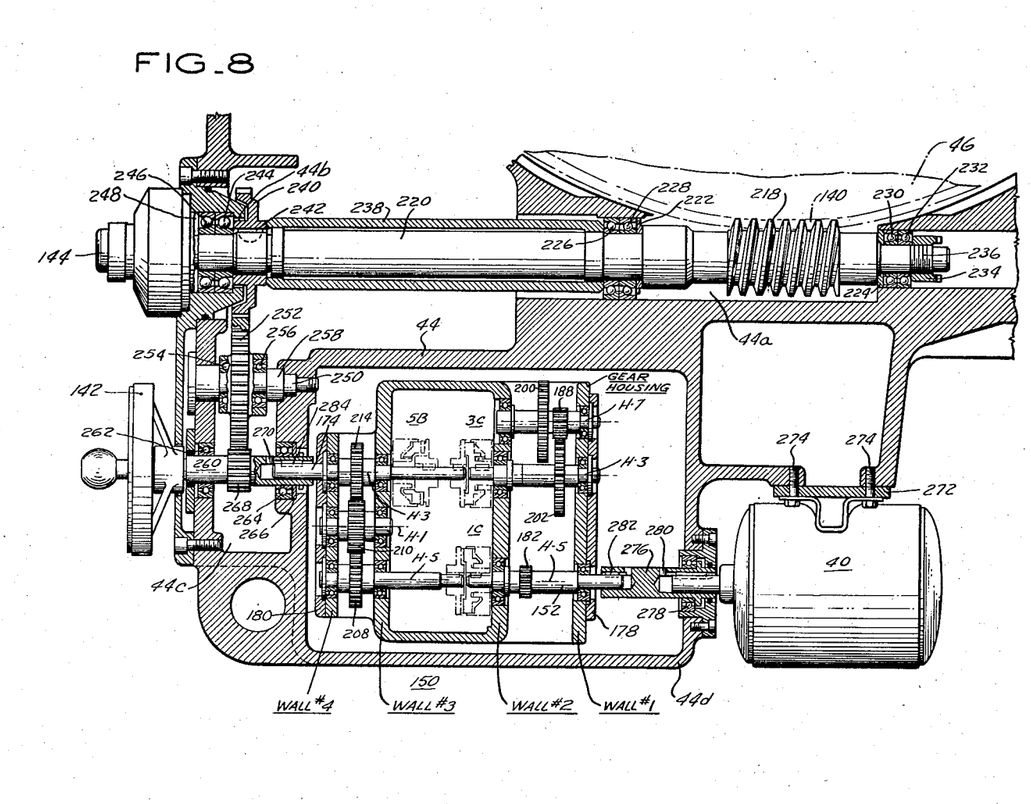
Fig. 8 is a top plan view, in section, showing the coupling between the motor and the worm and worm gearing used to drive the rotary table proper.

Completing the overall descriptive picture of the rotary table, the work support member 46 is carefully machined to provide a perfectly planar surface 136 (Fig. 3) upon which there are arranged a number of parallel T-slots 138. The purpose of these slots is to assist in mounting the piece to be worked to the surface 136 by means of T-bolts arranged in the slots. The support 46 is driven by the motor 40 through a worm 218 and worm gear 140 arrangement (Fig. 8). The table may be manually rotated when desired by means of hand wheel 142. The vernier dial 144 enables further calibration of the table to within 2 seconds of arc. A control panel 146 is conveniently located in view of the operator. In Fig. 4 the captions clearly show the various switches which control movement of the table 38. These controls will become more meaningful as the description proceeds. An indicating meter mounted on the panel is shown at 148. The box 150 contains the gearing and part of the electrical circuitry shown in Figs. 8, 10, 11 and 12 herein.

The coupling between the motor 40 and the support member 46 may best be understood by a detailed study of Figs. 8, 9A, 9B and 10.

Figure 9A:
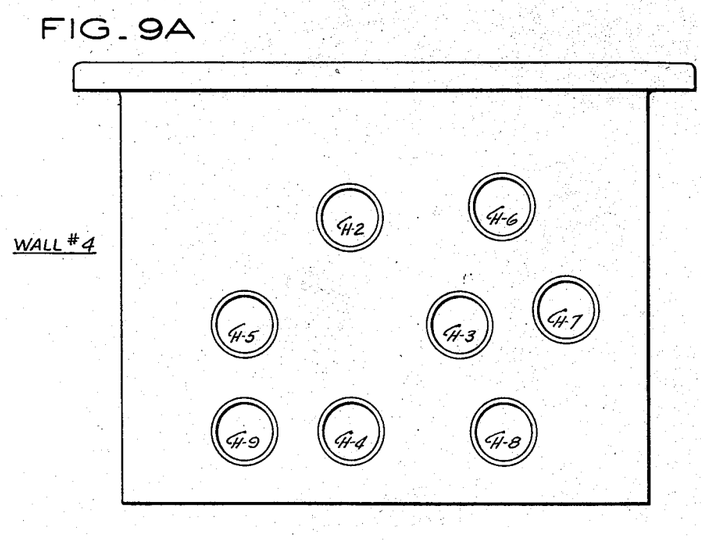
Fig. 9A is a diagrammatic view showing the location of the shaft holes in wall #1 for the gear housing of Fig. 8.
Figure 9B:
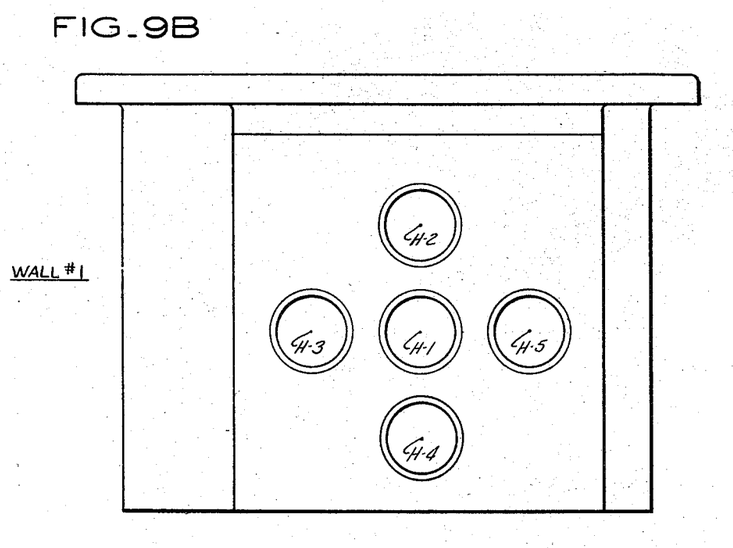
Fig. 9B is a similar diagrammatic view showing the location of the shaft holes in wall #4 of the gear housing of Fig. 8.
Figure 10:
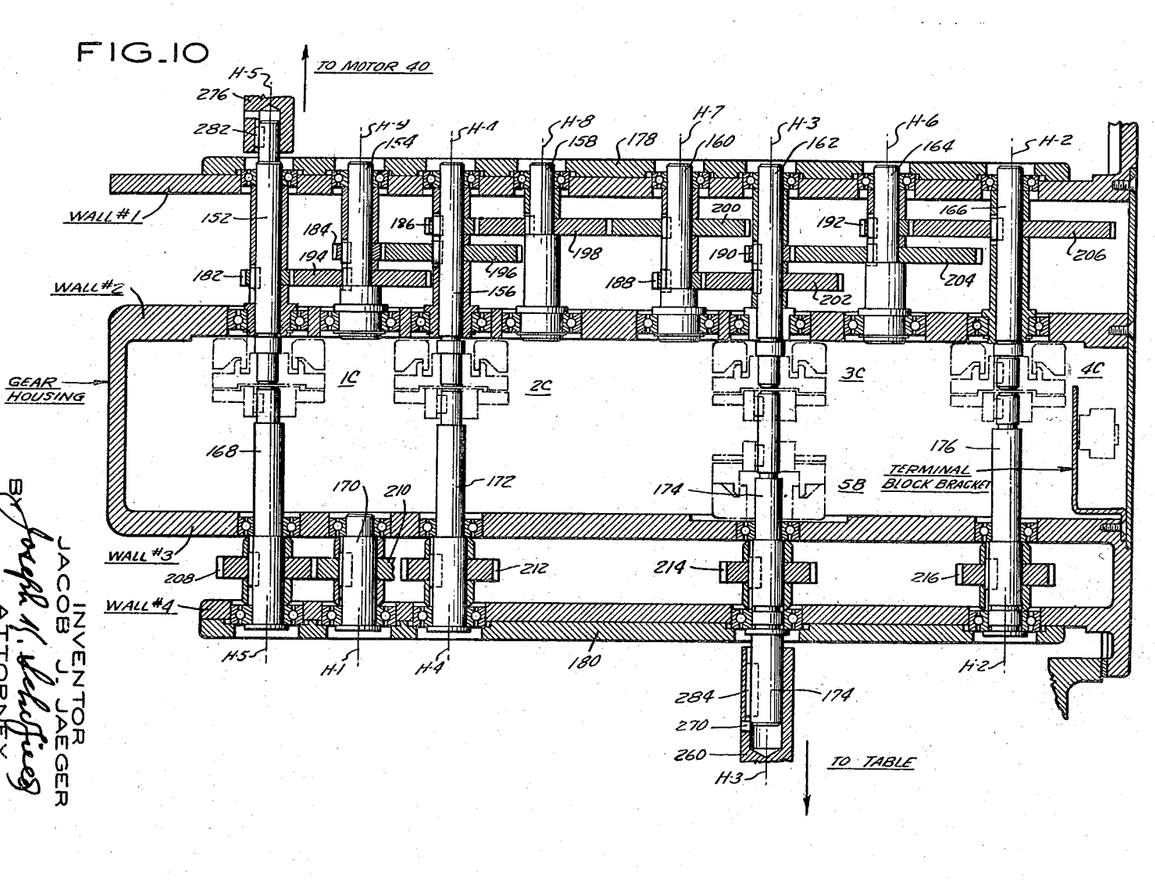
Fig. 10 is a development of the gearing and shafting of Fig. 8 showing these elements coupled to the motor drive to provide various speeds.

Within the box 150 (Fig. 3) there is a Gear Housing (Figs. 8 and 10) having four partitions or walls identified as: Wall #1, Wall #2, Wall #3 and Wall #4. Eight shafts 152, 154, 156, 158, 160, 162, 164, 166, extending between Walls #1 and #2 are rotatably mounted on ball bearings; these shafts are dimensionally located on center lines: H-5, H-9, H-4, H-8, H-7, H-3, H-6 and H-2 (Figs. 8, 9A and 10). Similarly, five shafts 168, 170, 172, 174, 176, extending between Walls #3 and #4, are rotatably mounted on ball bearings; these shafts are dimensionally located on center lines identified as: H-5, H-1, H-4, H-3, H-2 (Figs. 8, 9B and 10). The shafts 168, 172, 174 and 176 have elongated portions which extend into the space between Walls #2 and #3, and are adapted to be coupled to shafts 152, 156, 162 and 166 respectively, by means of electromagnetic clutches identified generally as 1C, 2C, 3C and 4C respectively (Figs. 8, 10). In addition shaft 174 is provided with an electromagnetic brake indicated generally as 5B. The Gear Housing is terminated at the ends by means of bearing retainer plates 178, 180 suitably secured to Wall #1 and Wall #4 respectively. Additional separate views of the Gear Housing are unnecessary to an understanding of this invention, since it forms no part of this invention, and it may have any extended configuration consistent with the requirements that it provide four walls which may be suitably bored to position the shafts in correct spatial relationship.

As will presently be made clear, a number of interlocking gears are arranged to provide four separate speeds between the motor 40 and the shaft 174. Gears 182, 184, 186, 188, 190 and 192 are mounted on shafts 152, 154, 156, 160, 162 and 164 respectively. Similarly gears 194, 196, 198, 200 and 202 are mounted on shafts 154, 156, 158, 160 and 162. Finally gears 204 and 206 are fixedly supported on shafts 164 and 166. From a study of Fig. 10 may be seen that the gears mounted on shafts 154, 158, 160 and 164 serve as intermediate gears.

Figure 11:
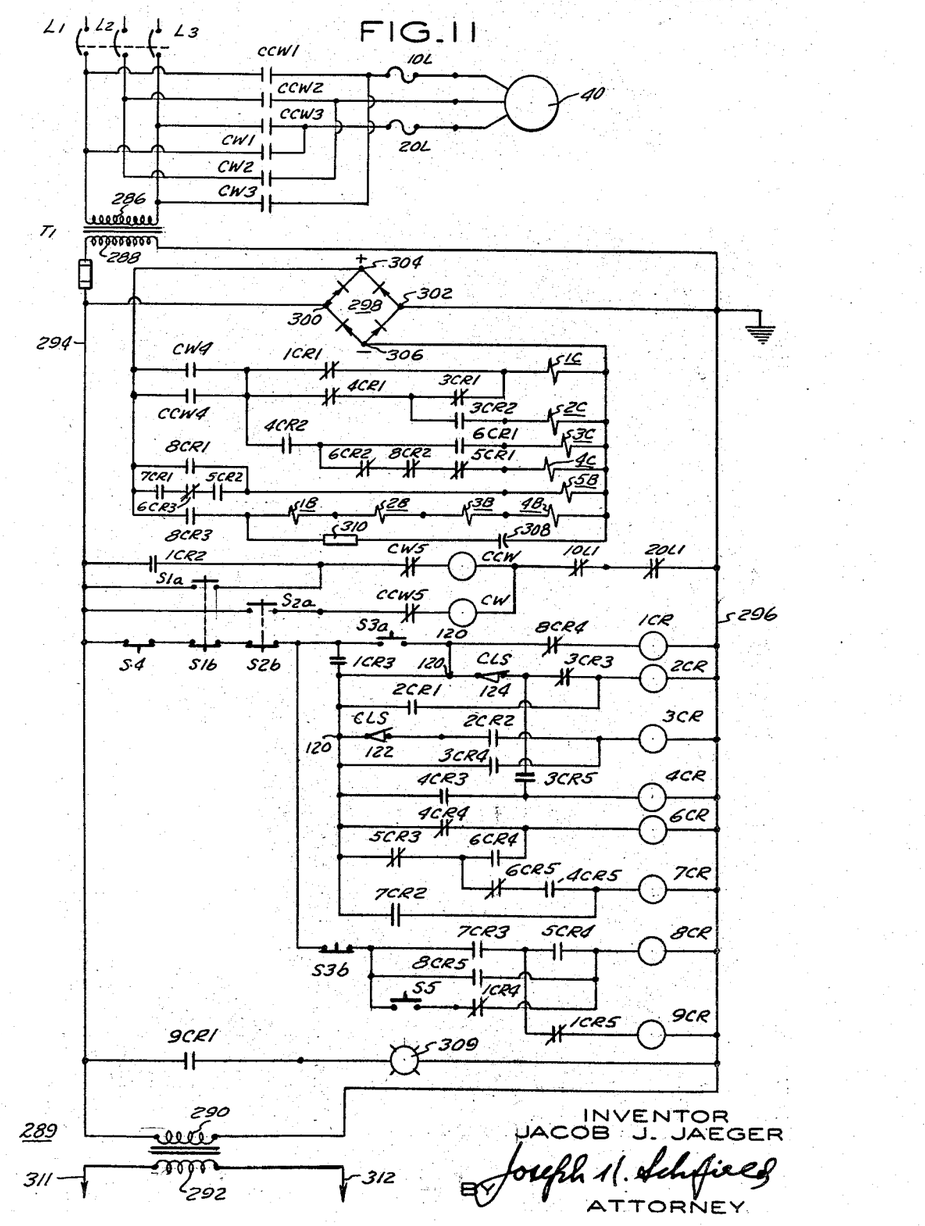
Figs. 11 and 12 are schematic diagrams showing the electric circuitry used to actuate and control the movement of the rotary table of this invention.

Between Walls #3 and #4 there are five gears 208, 210, 212, 214 and 216 suitably secured to shafts 168, 170, 172, 174 and 176. These gears are identical and are interconnected to provide a 1:1 ratio as will be appreciated from a study of the relative shaft positions (Figs. 9B and 11).

In one practical embodiment, the gears had the following number of teeth:

| Gear No.: | Teeth | Gear No.: | Teeth |
|---|---|---|---|
| 182 | 20 | 200 | 64 |
| 184 | 20 | 202 | 64 |
| 186 | 20 | 204 | 86 |
| 188 | 20 | 206 | 94 |
| 190 | 20 | 208 | 34 |
| 192 | 20 | 210 | 34 |
| 194 | 64 | 212 | 34 |
| 196 | 64 | 214 | 34 |
| 198 | 64 | 216 | 34 |

As previously indicated in connection with the description of Fig. 5, the work support member 46 is driven by a worm 218 and worm gear 140. The worm 218 is integral with a shaft 220, and is rotatably mounted at one end within a recessed portion 44a of the base 44, by means of spacers 222 and 224, and pre-loaded ball bearing members 226, 228 and 230, 232 respectively. The latter bearings are held in place by means of a lock nut 234 secured to a threaded reduced diameter portion 236 of the shaft 220. The ball bearings 226, 228 are held fast against spacer 222 by means of a longitudinal spacer 238 which at its other end is contiguous with a worm shaft gear 240 splined to shaft 220 at 242. At this other end, the shaft 220 is rotatably supported within a recessed portion 44b of the base 44, by means of pre-loaded ball bearings 244, 246 and a spacer 248 held in position on the shaft by suitable means not shown on the drawings.

The base casting 44 is recessed at 44c to provide space for gearing which will transmit rotary motion from shaft 174 to shaft 220. A shaft 250 is mounted in the walls of the base as shown. An intermediate gear stud 252 is rotatably mounted on the shaft 250 by means of ball bearings 254, 256 and the stud spacer 258. A shaft 260 is rotatably mounted in base 44 as shown by means of ball bearings 262, 264 and a spacer 266. A pinion gear 268 is mounted on shaft 260, the latter being internally recessed to receive shaft 174, and is permanently secured thereto by means of a pin 270 and spline 284. Thus rotary motion is transmitted: shaft 174, gear 268, gear 252, gear 240, to shaft 220. The hand wheel 142 is secured to the shaft 260 in any suitable manner so that rotation of the wheel will cause angular displacement of the shaft 220.

Completing the description of Fig. 8, the motor 40 is mounted on a platform 272 and is secured to the base 40 by means of bolts 274. A coupling shaft 276 is rotatably mounted in the wall 44d of the base 44 by means of ball bearings 278. The coupling member 276 is centrally recessed to receive the shaft of motor 40, and is permanently secured thereto by means of a pin 280 and a key (not identified). At the other end, coupling shaft 276 is bored to receive shaft 152, and is permanently secured thereto by means of a spline 282.

Figure 12:
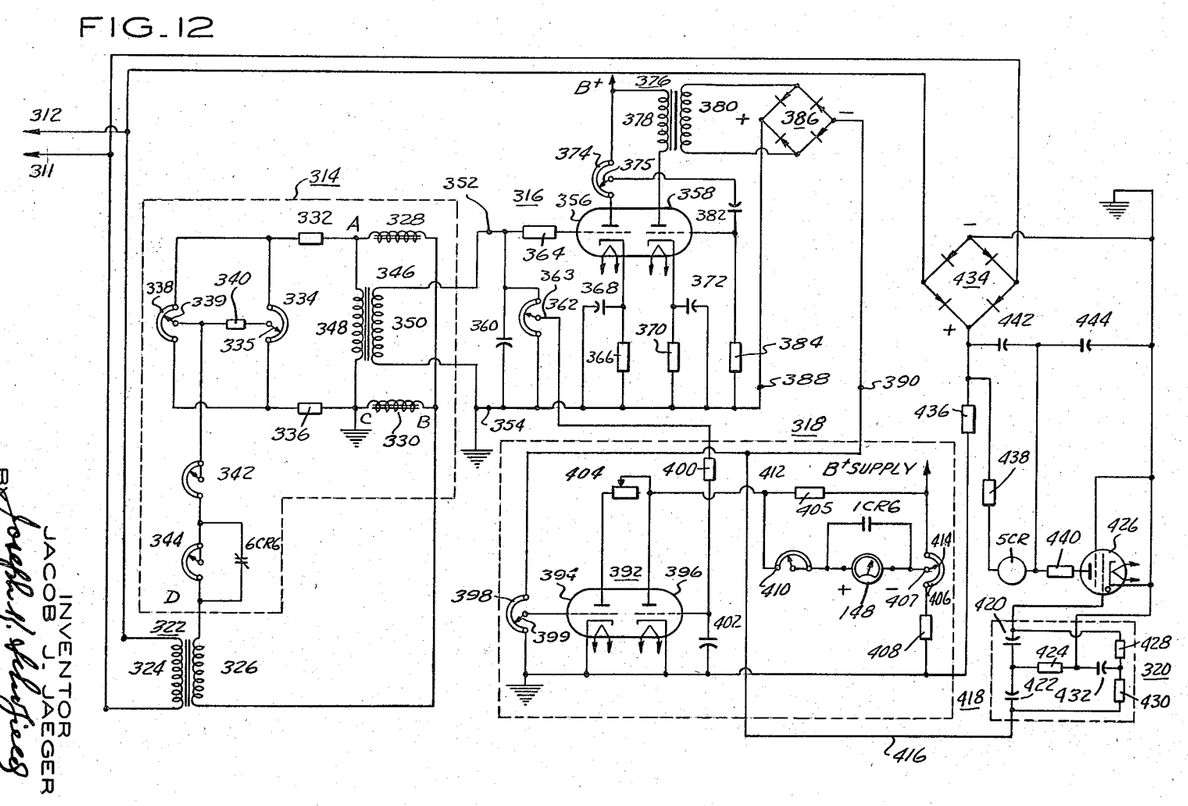

The electrical circuitry for controlling the actuation of the rotary table 38 is shown in Figs. 11 and 12. The diagram of Fig. 11 is of the so-called line to line type now used extensively in the machine tool art. In order to simplify the description of the circuitry for the reader, the following plan of identification has been adopted.

The low voltage control relays are designated by the letters "CR" with a preceding number to indicate the particular relay in question such as 1CR, 2CR, and the like. The contacts for the various relays are designated by the same letters and numerals used for the device as a whole, with a separate contact set number added. For example, control relay 1CR has contacts 1CR1, 1CR2, etc. Two particular relays have been identified as CCW or CW since they provide counterclockwise and clockwise rotation of the table 38 respectively. The associated set contacts, however, are designated in a usual manner. Thus relay CCW has contacts CCW1, CCW2, etc.

There are eleven relays 1CR to 9CR and relays CCW and CW having set contacts identified as follows:

1CR has six contacts:

| 1CR1 normally closed | 1CR4 normally closed |
| 1CR2 normally open | 1CR5 normally closed |
| 1CR3 normally open | 1CR6 normally open (Fig. 12) |

2CR has two contacts:

| 2CR1 normally open | 2CR2 normally open |

3CR has five contacts:

| 3CR1 normally closed | 3CR4 normally open |
| 3CR2 normally open | 3CR5 normally open |
| 3CR3 normally closed | |

4CR has five contacts:

| 4CR1 normally closed | 4CR4 normally closed |
| 4CR2 normally open | 4CR5 normally open |
| 4CR3 normally open | |

5CR (coil in Fig. 12) has four contacts (all contacts in Fig. 11):

| 5CR1 normally closed | 5CR3 normally closed |
| 5CR2 normally open | 5CR4 normally open |

6CR has six contacts:

| 6CR1 normally open | 6CR5 normally closed |
| 6CR2 normally closed | 6CR6 normally closed (con |
| 6CR3 normally closed | (contacts in Fig. 12) |
| 6CR4 normally open | |

7CR has three contacts:

| 7CR1 normally open | 7CR3 normally open |
| 7CR2 normally open | |

8CR has five contacts:

| 8CR1 normally open | 8CR4 normally closed |
| 8CR2 normally closed | 8CR5 normally open |
| 8CR3 normally open | |

9CR has one contact:

9CR1 normally open (*Note.*—If desired, 9CR may be provided with additional contacts for other purposes such as to shut off the power if the rotating table begins to creep.)

CCW has five contacts:

| CCW1 normally open | CCW4 normally open |
| CCW2 normally open | CCW5 normally closed |
| CCW3 normally open | |

CW has five contacts:

| CW1 normally open | CW4 normally open |
| CW2 normally open | CW5 normally closed |
| CW3 normally open | |

Overload heaters 10L and 20L each have a single contact which is normally closed:

| 10L1 normally closed | 20L1 normally closed |

The motor 40 is three phase and is connected to a three phase supply $L_1$, $L_2$, $L_3$ through 10L and 20L, and the various CW and CCW contacts as shown. A transformer $T_1$ has its primary 286 connected across $L_1$–$L_3$, and its secondary 288 is connected across the primary 290 of transformer 289 by means of lines 294 and 296. The line 296 is grounded as shown on the drawing.

A bridge rectifier is indicated generally at 298. The diagonally opposite corners of this rectifier are identified as 300 and 302, and 304 (+side) and 306 (—side). The rectifier is supplied with A. C. across diagonal corners 300, 302 which are connected to lines 294 and 296 (ground) respectively. The purpose of rectifier 298 is to supply D. C. to clutches 1C, 2C, 3C, 4C, and brakes 1B, 2B, 3B, 4B and 5B.

The negative side of the rectifier is connected: to one side of clutches 1C, 2C, 3C, 4C respectively, to one side of brakes 5B and 4B respectively, and to one side of condenser 308.

The other side of clutch 1C is connected in series with 1CR1 and CW4 to the positive side of the rectified supply. Contacts 4CR1 and 3CR1 are combined in series, the series combination being then connected in parallel with contacts 1CR1. Contact CCW4 is connected in parallel with CW4. The other side of clutch 2C is connected to the positive side of the rectifier 298 through contacts 3CR2, 4CR1 and CCW4 or CW4. The other side of clutch 3C is connected to the positive side of rectifier 298 through contacts 6CR1, 4CR2, CCW4 or CW4. Similarly, clutch 4C is returned to the positive side of the rectified supply through contacts 5CR1, 8CR2, 6CR2, 4CR2 and CW4 or CCW4.

The brake 5B completes its circuit to the positive side of rectifier 298 through contacts 8CR1 or through 5CR2, 6CR3 and 7CR1 in series. The brakes 1B, 2B and 3B are connected in series with brake 4B, the series combination of brakes being connected through contacts 8CR3 to the positive side of the rectified supply. A resistor 310 is connected in series with the condenser 308, the resulting series RC circuit being then connected in parallel with the series combination of brakes 1B to 4B.

One side of relay CCW is connected through 10L1, 20L1 to line 296, while the other side is connected through contacts CW5 and 1CR2 to line 294. The switch S1 consists of parts S1a and S1b ganged together so as to move in unison. The switch S1a is shunted across contacts 1CR2. The relay coil CW is connected at one side through overload contacts 10L1 and 20L1 to line 296, and at the other side through contacts CCW5 and switch S2a to line 294. Note that switch S2 also consists of parts S2a, S2b adapted to move together.

The relay coils 1CR, 2CR, 3CR, 4CR, 6CR, 7CR, 8CR and 9CR are connected at one side to ground.

Referring back to Fig. 6 for a moment, the CLS there depicted has been shown diagrammatically in Fig. 11 with two symbols both marked CLS. It will of course be understood that this representation is merely for the purpose of conveniently showing the electrical circuitry. Note that the electrical terminals 120, 122, 124 shown in Fig. 6, have been indicated by like numerals placed upon the electrically equivalent connections shown in Fig. 11.

The ungrounded side of 1CR is connected in series with contacts 8CR4, terminal 120 of CLS, switch S3a, switch S2b, switch S1b and switch S4 to line 294. Switch 3 is in two parts S3a and S3b adapted to move in unison.

The ungrounded side of relay coil 2CR is connected to line 294 through any one of three paths: path one is through contacts 2CR1, contacts 1CR3, switches S2b, S1b, S4 to line 294; path two is through contacts 3CR3, terminals 124, 120, 1CR3 and switches S2b, S1b and S4 to line 294; and finally path three through contacts 3CR3, contacts 3CR5, contacts 4CR3, contacts 1CR3, and switches S2b, S1b and S4 to line 294.

The other side of relay coil 3CR is connected to line 294 through two possible paths: path one through contacts 2CR2, terminal 122 of CLS, terminal 120 of CLS, contacts 1CR3, and switch S2b, S1b and S4 to line 294; the alternate or second path is through contacts 3CR4 which are shunted across terminals 120 and 122 of CLS and contacts 2CR2.

The relay coil 4CR is provided with two alternate paths to line 294: path one is through contacts 4CR3, contacts 1CR3 and switches S2b, S1b and S4 to line 294; path two is through contacts 3CR5, terminals 124 and 120 of CLS, contacts 1CR3, and through switches S2b, S1b and S4 to line 294.

The coil 6CR is through contacts 4CR4, contacts 1CR3 and switches S2b, S1b, and S4 to line 294, and alternately, through contact 6CR4, 5CR3, 1CR3, and switches S2B, S1B and S4 to line 294.

Coil 7CR is connected through contacts 4CR5, 6CR5, 5CR3, 1CR3, and switches S2b, S1b, S4 to line 294, and alternately, through contacts 7CR2, 1CR3, and switches S2b, S1b, S4 to line 294.

Coil 8CR is connected in three possible parallel paths: path one, through contacts 5CR4, 7CR3, switches S3b, S2b, S1b and S4 to line 294; path two is through contacts 8CR5, switches S3b, S2b, S1b and S4 to line 294; and path three through contacts 1CR4, switches S5, S3b, S2b, S1b, S4 to line 294.

The coil 9CR is connected through contacts 1CR5, 7CR3, switches S3b, S2b, S1b, S4 to line 294.

The single contacts 9CR1 are connected in series with set light 309, the series combination being connected across the supply lines 294–296. As will be explained later, relay 9CR may have additional contacts for monitoring or control purposes.

The electronic control circuitry for actuating the rotary table 38 is shown in Fig. 12. This circuitry comprises four main components: an electrolimit measuring system unit 314, an amplifier 316, a non-linear response circuit 318 and a triggering circuit 320.

The secondary voltage 292 of transformer 289 is carried by lines 311, 312 to the primary 324 of transformer 322.

The electrolimit measuring system unit 314 is essentially an impedance bridge of the type described in U. S. Patent 2,440,916. The diagonally opposite corners of the bridge are indicated at A, B, C and D. The legs AB and CB comprise iron core inductances 328, 330 respectively. A resistance 332, a potentiometer 334, and a resistance 336 are connected in series between bridge corners A and C as shown in the drawing. A potentiometer 338 has its outer ends connected to the corresponding outer ends of potentiometer 334 in parallel relation, the sliding contacts 335, 339 of the respective potentiometers being connected together through a resistance 340. Two rheostats 342, 344 are connected in series between the sliding contact 339 and the corner D of the bridge. The rheostat 344 is shunted by normally closed contacts 6CR6. The input to the bridge is taken from the secondary 326 of transformer 322 and applied across the bridge corners D, B. The output of the bridge is developed across the primary 348 of transformer 346 and is applied by means of the transformed secondary 350 to the input terminals 352, 354 of the amplifier 316.

The amplifier 316 comprises a pair of triodes 356, 358 each having a plate, grid, and cathode respectively. If desired these triodes may be contained in a single envelope such as the duo-triode 6SN7. A condenser 360 and a potentiometer 362 are connected in parallel across the amplifier input 352, 354. The grid of triode 356 is connected to input terminal 352 through resistance 364. Bias for the tube 356 is obtained by means of cathode biasing resistor 366 and condenser 368 connected in parallel between the cathode and ground. Tride 358 is simiarly biased by means of resistor 370 and condenser 372. The plates of triodes 356, 358 are connected to a suitable supply of B+ (unnumbered): the plate of triode 356 is connected by B+ through a potentiometer 374, while the plate of triode 358 is connected to B+ through the primary 378 of a transformer 376. The output of triode 356 is coupled to the grid of triode 358 through condenser 382 and resistance 384, one plate of condenser 382 being connected to potentiometer 374 through sliding contact 375.

The amplified output from the triodes is applied across the primary 378 of transformer 376, the secondary 380 of which is connected across diagonally opposite corners of a bridge rectifier indicated generally at 386. The rectified output of the bridge 386 is applied to terminals 388, 390, from whence it is applied to the input of the non-linear response circuit 318, and to the input of triggering circuit 320.

The response circuit 318 is described and claimed in the copending application of Edward E. Kirkham and Edward F. Nowak "Non-Linear Response Circuit" Serial No. 559,874, filed January 18, 1956. Briefly, the circuit comprises amplifier means indicated generally at 392, and in this particular embodiment comprises a pair of thermionic triode devices 394 and 396 connected in parallel with their respective cathodes grounded as shown. A selected portion of the amplifier-rectifier 316–386 output is applied to the grid of triode 394 by means of a potentiometer 398, which has its sliding contact 399 connected to the grid. The input to the grid of triode 396 is taken between the sliding contact 363 of potentiometer 362 (in amplifier 316) and ground. The sliding contact 363 is connected to the grid of triode 396 through current limiting resistance 400. The grid circuit of this latter triode includes a condenser 402 connected between grid and ground. A rheostat 404 is connected between the plates of triodes 394, 396. The plate voltage for both triodes is obtained from a common +B supply, the plate of triode 396 being connected to the +B supply through a resistor 405.

A potentiometer 406 and a resistor 408 are connected in series, the combination being in parallel with the +B source. The sliding contact 407 of potentiometer 406 is connected to one end of meter or ammeter 148, while the other end is connected to the output of the amplifier means 392 through an adjusting rheostat 410. The output terminals for this circuit are at 412 (the output of the amplifier means 392) and at 414 (the position of the sliding contact 407, which for any given adjustment, provides a standard or fixed potential). The metering means 148 is shunted by a pair of contacts 1CR6.

The output of the amplifier-rectifier combination 316–386 is applied via line 416 and ground to a double T-filter network indicated generally at 418. One T comprising condensers 420, 422 and resistance 424 is connected between the control grid of a tetrode thyratron 426 and ground: the cathode of thyratron 426 is at ground, and the condensers 420, 422 are in a series, and resistance 424 is connected between the junction of condensers 420, 422 and ground. In a similar manner the other T comprising resistances 428, 430 and condenser 432 are connected between the control grid of thyratron 426 and ground. The condenser 432 is connected to the junction of resistors 428 and 430 which are in series.

The screen grid of thyratron 426 is connected to ground. The plate supply for the thyratron is obtained from a bridge rectifier indicated generally at 434. The input to the bridge 434 is taken from the primary 324 of transformer 322. The output terminals are marked + and − as shown. The − terminal is grounded, and the + terminal is connected to ground through resistor 436. The + terminal of the bridge 434 is also connected to the plate of thyratron 426 through resistance 438, relay coil 5CR and resistance 440 which are in series. The resistor 438 and the coil 5CR are shunted by a condenser 442, one side of which is connected to the rectifier bridge + terminal, the other side of which is connected to a condenser 444, which has its other plate grounded as shown.

*Operation*

In order to prepare the rotary table 38 for automatic indexing, it is first necessary to establish the index points at the desired angular positions. The table dial graduations read to one minute, and by means of the table dial vernier 144 it is further possible to read to within two seconds of arc.

The table 38 is set at zero degrees (or any other convenient reference point), and the cover 128 is removed. An indexing dog (Fig. 7) is clamped to the dovetail pojection 96 (Fig. 5), and the dog is moved as required until the meter 148 reads zero. The dogs can be spaced as close as 3°, so that the maximum number of indexing points is 120.

The index point is located electromagnetically by means of the electrolimit measuring system 314 (Fig. 12) as briefly described supra in connection with Fig. 5, and more completely described in U. S. Patent 2,440,916. When the projection 106 (Fig. 7) is exactly between the coils 328 and 330 (Fig. 12), the output of the bridge 314 will be zero, and the indexing dog will be correctly located. The dog is then fastened securely in position by means of screw 104 (Fig. 7). The correct location of the dogs is readily obtained by utilizing the meter 148; this meter is actuated by the circuit indicated generally at 318. Briefly, this circuit arrangement (described in the copending application of Kirkham and Nowak supra) is such that the meter 148 produces a relatively small change in its dial reading in the region, from approximately full-scale to mid-scale for large error signals, and relatively large changes in its dial indication in the region from approximately mid-scale to zero for small error signals. The operator may thus quickly determine how much the adjusting dog needs be moved as zero is approached. The circuit 318 is more particularly described and claimed in the copending application of Kirkham and Nowak supra.

The operation of locating the dogs is then repeated for the next location, and so on, until all the indexing points are obtained. The rotary table 38 is now ready for automatic indexing.

In order to begin the automatic cycle, the cycle start switch S3 is depressed. As shown in Fig. 11, this switch consists of two parts S3a and S3b which are ganged so as to move in unison. The relay 8CR is deenergized (if it remains energized from a previous cycle) by the opening of S3b. The closing of S3a completes the circuit and energizes control relay 1CR through contacts 8CR4. Contacts 1CR6 close shorting out the meter 148. The contact 1CR3 closes holding relay 1CR energized when S3 is released. Relay 6CR is next energized by the closing of contacts 1CR3. The circuit may be traced: line 294, switches S4, S1b, S2b, contacts 1CR3, 4CR4, 6CR to line 296. The contact 6CR6 (Fig. 12) opens, reducing the sensitivity of the electrolimit impedance bridge 314 (Fig. 12).

The contact 1CR2 closes with the energization of 1CR, and the CCW starter relay is energized: 1CR2, CW5, CCW, 10L1, 20L1 to line 296. The starter contacts CCW1, CCW2, CCW3, CCW4 close and starter contacts CCW5 open. The opening of these latter contacts insures that the clockwise relay CW will remain deenergized. The motor 40 is energized. High speed clutch 1C is energized through contacts CCW4, 4CR1, 3CR1. The energization of clutch 1C (Fig. 10) couples shaft 152 with shaft 168 by electromagnetic action, and through the gearing to shaft 174 (Fig. 10); the table 38 now begins to rotate counter-clockwise at speed one.

The CLS (Fig. 6) is shown in the so-called released position. Note that terminal 120 is electrically connected to terminal 124. In the electrical diagram of Fig. 11, for convenience the cycle limit switch CLS is shown in two parts, although it should be understood that the switch is physically a unitary member as may be seen in Fig. 6. The electrically equivalent points corresponding to terminals 120, 122 and 124 have been given like numerical designation in Fig. 11.

If the CLS is released (as shown in Figs. 6 and 11), relay 2CR is energized: 3CR3, terminals 124, 120, 1CR3, S2b, S1b, and S4. Contact 2CR1 closes holding 2CR energized for the remainder of the cycle.

If the CLS is actuated (terminals 120 and 122 interconnected) counter-clockwise rotation of the table proceeds until CLS is released (i. e. dog 98 is no longer depressing the plunger 118, so that spring leaf member 126 is in contact with terminal 124).

As counter-clockwise rotation proceeds, the null position is approached. The dog 98 (Fig. 6) riding on wheel 116 depresses the plunger 118, and the CLS is actuated: terminal 120 is electrically connected to 122. The relay 3CR is energized: contacts 2CR2, terminals 122 and 120, 1CR3, S2b, S1b, S4. Contact 3CR4 closes, holding relay 3CR energized for the remainder of the cycle. Contacts 3CR1 open, deenergizing high speed clutch 1C. Contact 3CR2 closes energizing the second speed clutch 2C. The energization of clutch 2C couples shaft 156 with shaft 172 by electromagnetic action, and through the 1:1 gearing to shaft 174 (Fig. 10). The gears 182, 194, 184, 196 produce a reduction in speed, and the table 38 continues to rotate counter-clockwise at speed two.

The table proceeds at speed two until the CLS is released again. That is, the table 38 passes the set point, and the dog is no longer riding on the wheel 116. Terminals 120 and 124 are electrically connected energizing relay 4CR: contacts 3CR5, terminals 120, 124, 1CR3, S2b, S1b, S4. Contact 4CR3 closes, holding CR4 energized for the remainder of the cycle.

Contact 4CR4 opens; however, relay 6CR is held energized through contacts 6CR4 and 5CR3. Contact 4CR1 opens deenergizing the second speed clutch 2C while contact 4CR2 closes energizing the third speed clutch 3C. (The gearing is so arranged that with motor 40 turning in the same direction as before, the table 38 is rotated clockwise with either clutches 3C or 4C energized.) The clutch 3C couples shaft 162 with shaft 174. The gearing 182, 194, 184, 196, 186, 198, 200, 188 and 202 provides a further reduction in speed, and also causes the table to rotate clockwise toward the null position.

It will be convenient at this point to consider the circuitry of Fig. 12. The electrolimit impedance bridge 314 produces an error signal which is amplified by the amplifier 316, rectified by bridge rectifier 386, and applied to the non-linear response circuit 318, and to the thyratron trigger circuit 320 (a part of the error signal is also applied from the electrolimit impedance bridge 314 directly to the non-linear circuit 318 without amplification).

In the absence of a signal (zero error), the thyratron 426 is conducting; the relay 5CR which is in the plate circuit is thus energized.

As the table 38 proceeds clockwise at speed three, the null position is approached, and the signal is small enough to look like zero error to the trigger circuit 320. Thus, acting as though there were no signal at all, the thyratron 426 fires, and relay 5CR is energized.

Contacts 5CR3 open; this action deenergizes relay 6CR. Contacts 6CR4 open and contacts 6CR5 close. The contacts 6CR6 shunting rheostat 344 (Fig. 12) also close reestablishing full sensitivity for the electrolimit impedance bridge 314. Contacts 6CR1 open deenergizing the third speed clutch 3C, while contacts 6CR2 close. With the restoration of bridge sensitivity, a large error signal is now developed by the bridge 314; the thyratron 426 is now extinguished, and relay 5CR is deenergized.

Contacts 5CR3 close energizing relay 7CR: contacts 4CR, 6CR5, 5CR3, 1CR3, switches S2b, S1b, S4. Contacts 7CR2 close, holding relay 7CR energized for the remainder of the cycle. Contacts 5CR1 close energizing low speed clutch 4C, through contacts 5CR1, 8CR2, 6CR2, 4CR2 and CCW4. The clutch 4C couples shaft 166 to shaft 176, and through the 1:1 gearing to shaft 174. The gearing 182, 194, 184, 196, 186, 198, 200, 188, 202, 190, 204 192 and 206 produces a still further reduction in speed in the clockwise direction. The table 38 is now moving at speed four.

At the null point, the projection 106 of dog 98 centers itself exactly midway between coils 328 and 330 of the electrolimit bridge 314. The error is thus zero, and thyratron 426 fires again. The relay 5CR is thus reenergized, and its associated contacts respond to this excitation. Contacts 5CR1 open deenergizing fourth speed clutch 4C. Contacts 5CR2 close energizing brake 5B. Contacts 5CR4 close energizing relay 8CR.

Contacts 8CR5 close, holding relay 8CR energized until any one of switches S1, S2, S3 or S4 is actuated. Contacts 8CR1 close, holding brake 5B energized. Contacts 8CR3 close, energizing brakes 1B, 2B, 3B and 4B. As may be seen in Fig. 5, ring diaphragm 88 and the binder plate 92 are clamped tightly together by electromagnetic action, thus holding the work support member firmly in position.

Contacts 8CR4 open, deenergizing relay 1CR. Contact 1CR3 opens, deenergizing relays 2CR, 3CR, 4CR, and 7CR by an obvious open circuit. Contact 1CR5 closes, energizing relay 9CR: contacts 1CR5, 7CR3, S3b, S2b, S1b, and S4. Contacts 9CR1 close, energizing the on set light 309. With the deenergizing of relay 1CR, contacts 1CR6 open and the meter 148 is again operative. This serves as a further check for the operator to indicate that he is at the indexing point.

The rotary table 38 is now in position for any operation intended to be performed at the set point. As previously stated, relay 9CR may include additional contacts to operate other machine motions or to prevent undesired action.

If excessive tool pressure results in a rotational drift of the work piece and the rotary table 38, an error signal will develop because projection 106 on dog 98 will move closer to one or the other of coils 328, 330. The error signal thus causes thyratron 426 to be extinguished, and relay 5CR is deenergized; contacts 5CR4 open, deenergizing 8CR, contacts 8CR4 close, energizing relay 1CR, contacts 1CR5 open, deenergizing relay 9CR, and opening contacts 9CR1. The light 309 goes out, informing the operator of the undesirable condition.

If the operator desires to move the table clockwise from a position of rest, it is merely necessary to depress switch S2. This opens the circuit at S2b and closes the circuit at S2a. This action energizes the relay CW: 20L1, 10L1, CW, CCW5, S2a. The contacts CW1, CW2, CW3, and CW4 close and the motor rotates so as to move the table 38 clockwise.

Note that actuating the switch S2 to call for clockwise rotation of the table 38, or calling for counter-clockwise rotation by actuating S1, or calling for the cycle to stop by actuating the switch S4, will interrupt the automatic cycle at any point. Release of any one of these: S1, S2, or S4 results in the rotary table 38 coming to rest with brakes 1B, 2B, 3B, 4B unclamped and brake 5B deenergized. To set the brake 5B and energize brakes 1B, 2B, 3B and 4B it is necessary to depress the binder clamp switch S5.

While a specific embodiment has been shown and described, it will of course be understood that various other modifications may yet be devised by those skilled in the art which will embody the principles of the invention and found in the true spirit and scope thereof.

What is claimed is:

1. In a machine tool, a support arranged to be movable to a preselected position, means for displacing said support, and means for controlling said displacing means to advance said support at successively reduced speeds, and then to reverse the direction of said movement of the support in moving the support into said preselected position.

2. In a machine tool, a support arranged to be movable to a preselected position, motor means for moving said support, electromechanical power transmission means between said motor means and said support for providing a driving connection therefor, and control means for controlling said power transmission means to advance the support at successively reduced speeds to a point beyond said preselected position, and then to reverse the direction of movement so as to arrive at said preselected position without hunting.

3. In a machine tool, a support movable to a preselected stationary position, motor means for moving said support, electromechanical power transmission means providing a driving connection between said motor means and said support, control means for controlling said power transmission means to advance the support at successively reduced speeds beyond said preselected position, and then to reverse the direction of movement of said support so as to arrive at said preselected position, and braking means actuatable by said control means for holding said work support fixedly in said preselected position.

4. In a machine tool, a support arranged to be movable to a preselected position, motor means for displacing said support, electromechanical power transmission means providing a driving connection between said motor means and said support, control means comprising switching means responsive to movement of said support, an impedance bridge including a pair of inductance arms, magnetic means adjustably secured to said support and magnetically coupled to said inductance pair to vary the electrical balance of said bridge, whereby the bridge output is a function of the proximity of the support to the preselected position, and relay means actuated by said switching means and said bridge output, said relay means selectively energizing the power transmission means to vary the speed and direction of displacement of said support, whereby the support is successively advanced beyond said preselected position and then reversed in direction so that the support comes to rest at said preselected position, with the bridge output equal to zero.

5. In a machine tool, a support arranged to be movable to a preselected or null position, motor means for displacing said support, electromechanical power transmission means comprising clutch means, providing a driving connection between said motor means and said support, control means comprising switching means responsive to movement of said support, an impedance bridge including a pair of inductance arms, magnetic means adjustably secured to said support and magnetically coupled to said inductance pair to vary the electrical balance of said bridge, whereby the bridge output is a function of the displacement of the support from the null position, and a plurality of relay means actuated by said switching means and responsive to said bridge output, said relay means sequentially energizing the clutch means to vary the speed and direction of displacement of said support, whereby the support is successively advanced beyond the null position and then reversed in direction so as to come to rest at the null position, with the bridge output equal to zero.

6. A machine tool according to claim 5 including braking means energized by said relay means when the support stops at the null position.

7. In a machine tool, a support movable to a preselected or null position, motor means for moving said support, electromechanical power transmission means providing a driving connection between said motor means and said support, dogging magnetic means accurately mountable on the support to define a desired preselected position, control means comprising switching means actuated by said dogging means, an impedance bridge including a pair of inductance arms, said dogging magnetic means being magnetically coupled to said inductance pair to vary the electrical balance of said bridge, whereby the bridge output is a function of the displacement of the support from the null position, and a first relay means actuated by said switching means, a triggering circuit connected to the bridge output and including second relay means actuated by said triggering circuit, said first and second relay means sequentially actuating the power transmission means to change the speed and direction of rotation of said support, whereby the support is successively advanced beyond the null position and then reversed in direction so as to arrive at the null position without overshoot, the bridge output being equal to zero.

8. In a machine tool, a support arranged to be movable to a preselected or null position, motor means for moving said support, electromechanical power transmission means between said motor means and said support for providing a driving connection, control means for controlling said power transmission means to successively advance the support beyond the said null, and then to reverse the direction of movement so as to come to rest at said null, and means responsive to the arrival of said support in the null position to uncouple said motor means from said support and to hold said support fixedly at said null.

9. In combination a support movable to a preselected position, motor means for moving said support, electromechanical power transmission means providing a driving connection between said motor means and said support, setting means accurately mountable on the support to define a desired null position, control means comprising response means actuated by said setting means, an electromagnetic circuit having a current output which is a function of the displacement of the support from the desired null, first relay means actuated by said response means, triggering circuit means connected to the said electromagnetic output and including second relay means actuatable by said triggering circuit, said first and second relay means sequentially actuating the power transmission means to provide forward and then reverse travel of the support, and means responsive to the arrival of said support at the null position to uncouple said motor means from said support and to securely hold said support at said desired null position.

References Cited in the file of this patent

UNITED STATES PATENTS

| | | |
|---|---|---|
| 2,011,488 | Swahnberg | Aug. 13, 1935 |
| 2,334,544 | Curtis | Nov. 16, 1943 |
| 2,360,118 | Gallimore et al. | Oct. 10, 1944 |
| 2,440,916 | Reesnak | May 4, 1948 |
| 2,481,383 | Bickel et al. | Sept. 6, 1949 |
| 2,629,163 | Makant | Feb. 24, 1953 |
| 2,645,981 | Hirvonen | July 21, 1953 |
| 2,807,175 | Tandler et al. | Sept. 24, 1957 |
| 2,820,936 | Rainey | Jan. 21, 1958 |